Nov. 25, 1947.　　　R. D. MORSE　　　2,431,494
VARIABLE SPEED TRANSMISSION
Filed June 19, 1945　　　4 Sheets-Sheet 1
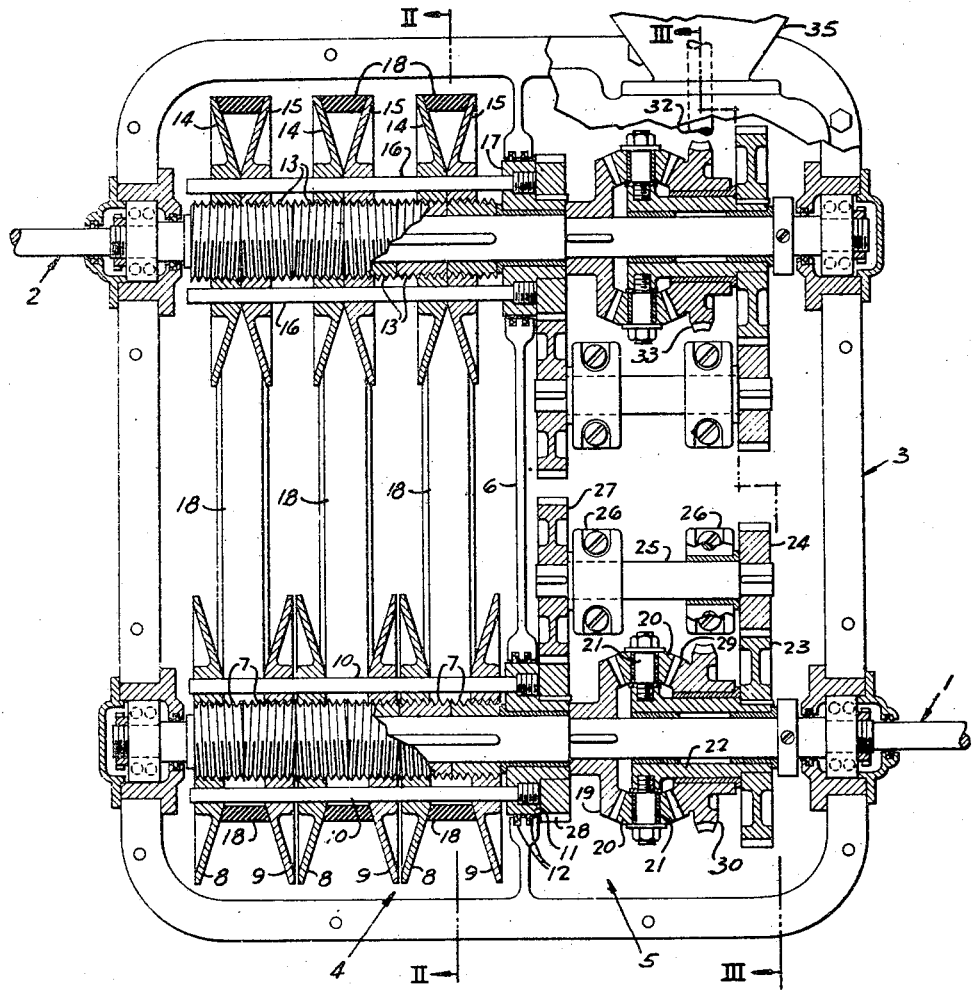
Fig. I
INVENTOR.
Robert D. Morse
BY
Marshall & Marshall
ATTORNEYS Nov. 25, 1947.  R. D. MORSE  2,431,494
VARIABLE SPEED TRANSMISSION
Filed June 19, 1945   4 Sheets-Sheet 2
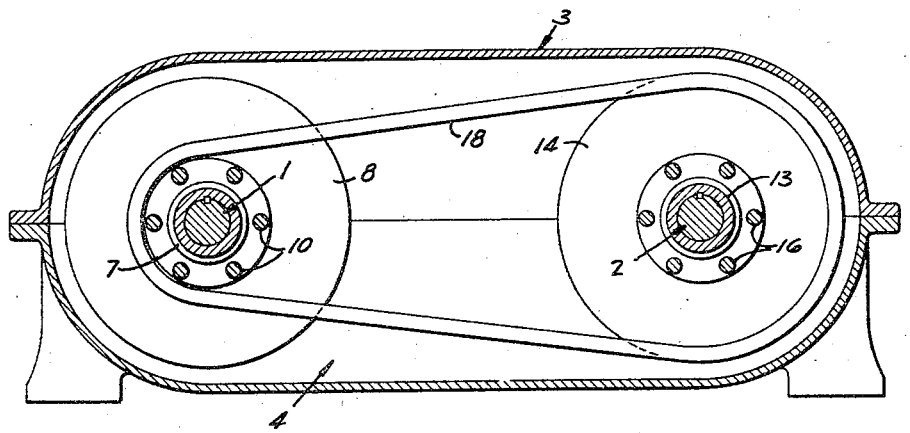
Fig. II
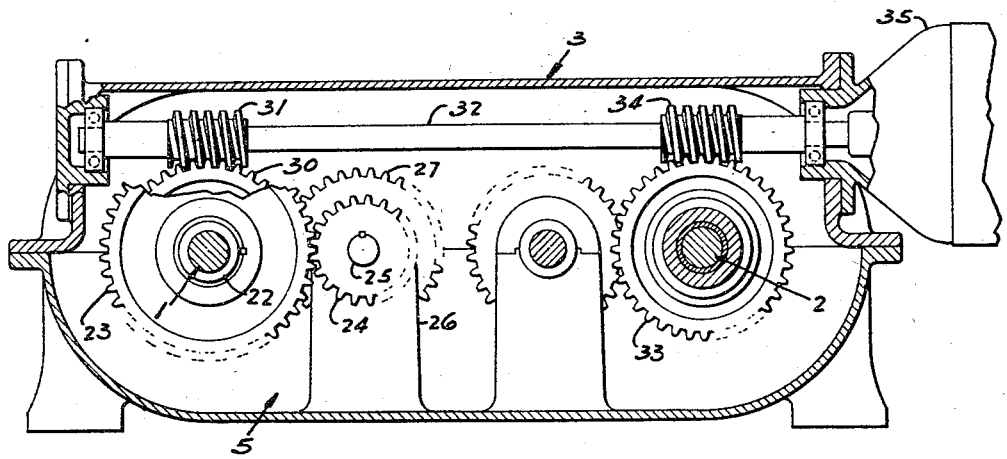
Fig. III
INVENTOR.
Robert D. Morse
BY
Marshall & Marshall
ATTORNEYS

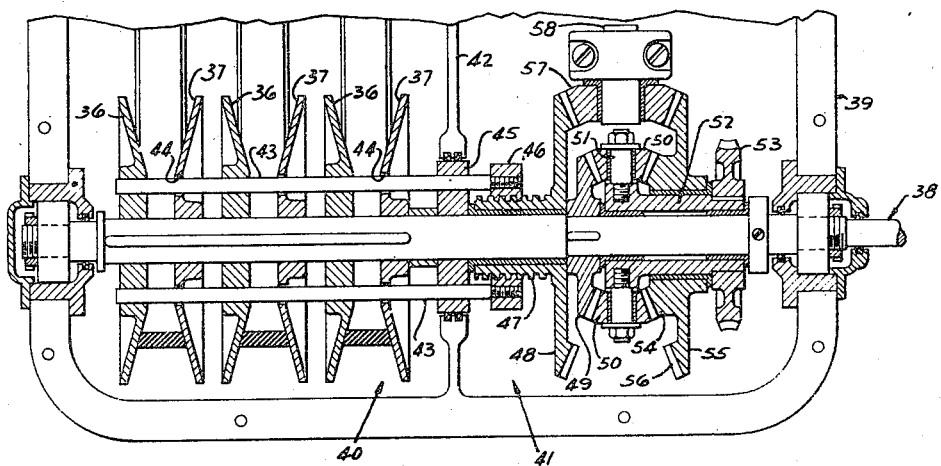

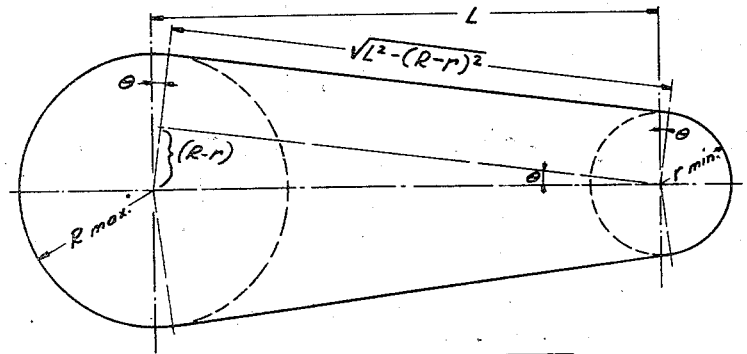
*Fig. VII*
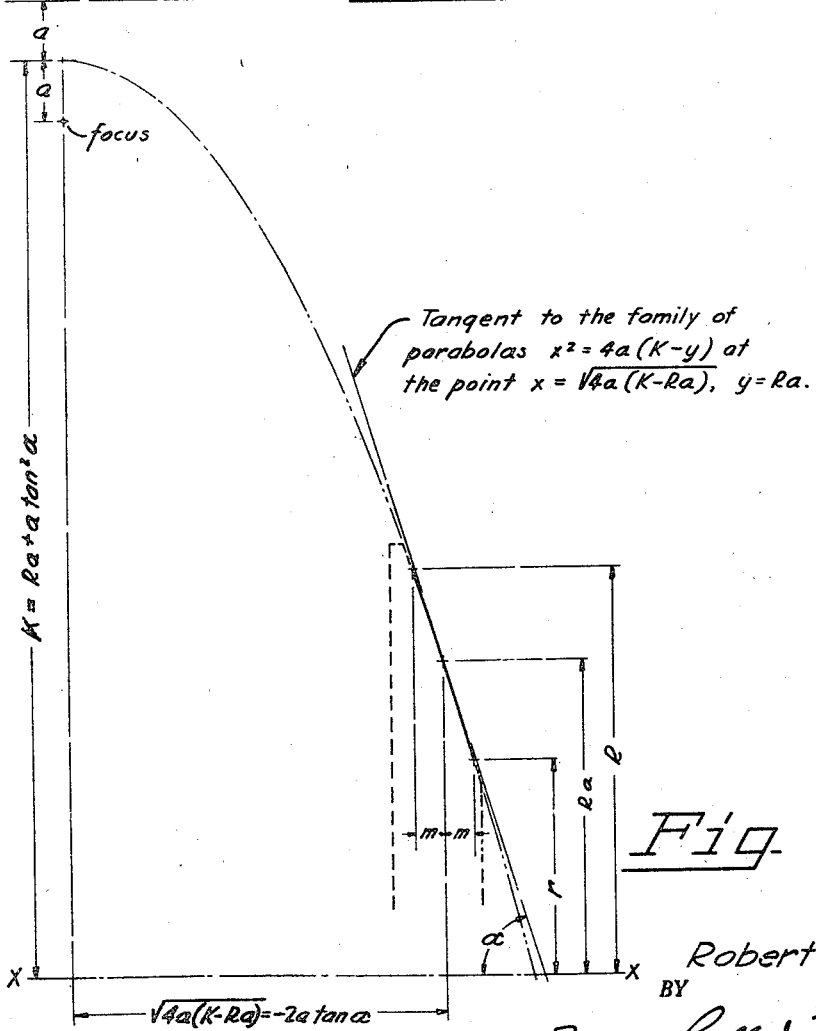
*Fig. VIII*

Patented Nov. 25, 1947

2,431,494

UNITED STATES PATENT OFFICE 2,431,494

VARIABLE-SPEED TRANSMISSION

Robert D. Morse, Monroe, Mich.

Application June 19, 1945, Serial No. 600,391

4 Claims. (Cl. 74—230.17)

This invention relates to variable ratio V-belt power transmitting equipment and in particular to means for positively varying the pitch diameter of cooperating V-belt pulleys.

Variable ratio V-belt drives are in use where moderate changes in speed ratios are required and the speed ratio does not have to be precisely maintained. The ordinary method of varying the pitch diameter of a V-belt pulley is to slidably mount half of the pulley on the shaft and to hold it in position against the wedging action of a V-belt by means of a thrust bearing. This type of construction results in an end thrust being transmitted to the shaft carrying the other half of the pulley and suitable thrust bearings must be provided to carry this thrust. The use of thrust bearings suffers a disadvantage that it is difficult to precisely position the halves of a pulley with respect to each other and to maintain that spacing under wide variations in load.

The object of this invention is to provide positive means for positioning the halves of a variable ratio V-belt pulley with respect to each other.

Another object is to provide a variable ratio V-belt pulley assembly in which no axial thrust is transmitted to the bearings journaling the shafts.

Another object of the invention is to provide gearing connecting the pitch diameter adjusting means on each of two shafts such that the pulley halves on the two shafts will be moved precisely equal and opposite distances when a change in ratio is effected.

These and other objects and advantages are apparent from the following description and drawings showing specific embodiments of the invention.

According to the invention the axial spacing between the halves of a variable ratio V-belt transmission pulley is controlled and adjusted by means of threaded members acting between the pulley halves and the shaft. The threaded members and the shaft are connected through a differential gear train which permits the threaded means and the shaft to rotate synchronously as long as the adjusting gear is stationary but which produce relative rotation between the threaded means and the shaft when the adjusting gear is moved.

The invention further contemplates suitably shaping the faces of the pulley halves so that uniform belt tension is maintained as the speed ratio is varied from maximum to minimum.

Examples of variable ratio V-belt transmissions embodying the invention are shown in the accompanying drawings.

In the drawings:

Figure I is a plan view partly in section and with parts broken away, of a variable ratio V-belt transmission embodying the improved ratio adjusting means.

Figure II is a vertical section of a V-belt transmission taken substantially along the line II—II of Figure I.

Figure III is a vertical section taken substantially along the line III—III of Figure I.

Figure IV is a fragmentary plan view showing another method of positioning the pulley halves of a V-belt transmission.

Figure V is a fragmentary plan view partly in section showing another gear train suitable for use in adjusting the pitch diameter of the pulleys of a V-belt transmission.

Figure VI is a fragmentary plan view of still another form of gear train suitable for use in practicing the invention.

Figure VII is a diagram illustrating the computation of the length of belt required.

Figure VIII is a diagram illustrating the computation of one shape of pulley for maintaining constant belt tension.

These specific figures and the accompanying description are intended merely to disclose and illustrate the invention and not to impose limitations upon the claims.

In the first example of a variable ratio V-belt transmission embodying the invention an input shaft 1 and an output shaft 2 are journaled in bearings located in the walls of a housing 3. The housing 3 is divided into two compartments 4 and 5 by a transverse wall 6 extending perpendicularly to the parallel input and output shafts 1 and 2. A series of threaded sleeves 7 are keyed to that portion of the input shaft 1 which extends across the chamber 4. The sleeves 7 having alternately right and left hand threads carry a plurality of pulley halves 8 and 9, the halves 8 being threaded on the right hand sleeves and the halves 9 being threaded on the left hand sleeves. The halves 8 and 9 are maintained in rotational alignment by a series of rods 10 which extend axially through holes drilled in the pulley halves 8 and 9 and which are secured in an adjusting member 11 journaled on the shaft 1 in the plane of the dividing wall 6. Oil seals 12 bearing on the periphery of the adjusting member 11 prevent any flow or leakage of lubricating oil from the chamber 5 into the chamber 4.

The output shaft 2 in a space within the chamber 4 has a series of threaded sleeves 13 keyed thereto. The sleeves 13, similar to the sleeves 7, have alternately right and left hand threads which mesh with corresponding threads in the hubs of pulley halves 14 and 15. The pulley halves 14 are threaded on the left hand sleeves 13 while the pulley halves 15 are threaded on right hand sleeves. Another series of rods 16 similar to the rods 10 are fitted through the pulley halves 14 and 15 and secured in an adjusting member 17 journaled on the output shaft 2. A series of V-belts 18 trained over the pulleys formed of the pulley halves 8 and 9 and those formed by the pulley halves 14 and 15 transmit power from the input shaft 1 to the output shaft 2.

When either of the adjusting members 11 or 17 is rotated with respect to the shaft on which it is journaled the pulley halves are rotated with respect to the threaded sleeves. For example, rotation of the input shaft 1 clockwise as viewed from the right end of the shaft as seen in Figure I, while holding the adjusting member 11 stationary, causes the pulley halves 8 and 9 to approach each other thereby increasing the pitch diameter of the V-pulleys formed thereby. Similarly, clockwise rotation of the output shaft 2 with respect to its adjusting member 17 separates the pulley halves 14 and 15 thereby decreasing their effective pitch diameters.

When the speed ratio is not being changed the adjusting members and the shafts must rotate at exactly the same velocity. According to the invention this synchronous rotation of the drive shaft 1 and the adjusting member 11 is secured by a differential gear train.

The gear train comprises a beveled gear 19 keyed to the shaft 1 and meshing with a pair of idler pinions 20 journaled on studs 21 projecting laterally from a sleeve 22. The sleeve 22 is loosely journaled on the shaft 1 and carries a spur gear 23. The spur gear 23 in turn meshes with a pinion 24 keyed to a short shaft 25 which is journaled in a pair of pedestals 26. The other end of the short shaft 25 carries another spur gear 27 meshing with a gear 28 keyed to the adjusting member 11.

The idlers 20 which mesh with the bevel gear 19 keyed to the shaft 1 also mesh with a bevel gear 29 the same as the bevel gear 19 except that it is formed on the side of a worm wheel 30 which is journaled on the sleeve 22. The worm wheel 30 meshes with a worm 31 (Figure III) which is carried on a shaft 32 extending through the chamber 5 transversely to the input and output shafts 1 and 2. As long as the worm wheel 30 is held stationary, i. e., no change in pitch diameter of the pulleys is being made, rotation of the shaft 1 driving through the bevel gear 19 and the idlers 20 rotates the sleeve 22 at half the speed of the input shaft 1. The rotation of the sleeve 22 is transmitted through the gear train comprising the pairs of gears 23, 24 and 27, 28 to drive the adjusting member 11. The gears 23, 24, 27 and 28 are designed to provide a two-to-one increase in speed so that the half speed rotation of the sleeve 22 appears as full speed rotation of the gear 28 and adjusting member 11. Therefore, as long as the worm wheel 30 is held stationary no relative rotation takes place between the input shaft 1 and the adjusting member 11 and consequently there is no change in pitch diameter of the pulleys formed by the pulley halves 8 and 9.

If the input shaft 1 is held stationary and the worm wheel 30 is rotated the sleeve 22 rotates at half the speed of the worm wheel 30 and this half speed rotation is transmitted through the gears 23, 24, 27 and 28 to provide rotation of the gear 28 and the adjusting member 11 attached thereto in the same direction and at the same speed as the worm wheel 30. Thus, when the shaft 1 is stationary and the worm wheel 30 is rotated relative rotation occurs between the adjusting member 11 and the sleeves 7 keyed to the shaft 1 so that the pitch diameter of the pulleys is changed accordingly.

It is not necessary that the shaft 1 be held stationary while the worm wheel 30 is rotated because the effect of each motion on the rotation of the adjusting member 11 is independent of the other.

The output shaft 2 is supplied with a similar gear train for rotating its adjusting member 17 with respect to the shaft 2. A worm wheel 33 of this gear train—the counterpart of the worm wheel 30—meshes with a worm 34 on the worm shaft 32 (Figure III). Rotation of the worm shaft 32 rotates the worm wheels 30 and 33 equal amounts thus producing equal relative rotations between the adjusting members 11 and 17 and the shafts 1 and 2. The pitch of the threads on the sleeves 7 and 13 are the same, therefore the axial shift of the pulley halves 8 and 9 is exactly equal and opposite to the axial shift of the pulley halves 14 and 15 so that precise adjustment of the pitch diameter may be readily controlled.

Changes in pitch may be accomplished by manually rotating the worm shaft 32 or by driving it with a pitch changing motor 35 as indicated in the drawings. If a motor is used it should be preferably equipped with a gear reduction and a brake so that adequate control of the pitch diameters of the pulleys may be maintained.

In this method of adjusting the pitch diameter of a variable speed transmission pulley all of the thrust exerted by the wedging action of the V-belts is absorbed within the shaft itself and does not exert any thrust on the bearings journaling the shaft. Therefore there are no thrust bearings to wear or to get out of order. The wedging action of the V-belts also introduces friction between the pulley halves and the threaded sleeves so that the greater part of the torque being transmitted by the belt to either of the shafts is carried through the friction of the pulley halves on the threads rather than through the aligning rods 10 and the gear train. The gear train thus runs with little or no load except when changes in pitch diameter are being made.

In the next example of the invention pulley halves 36 and 37 are mounted directly on an input shaft 38 which is journaled in a housing 39. The housing 39 is divided into a belt chamber 40 and gear chamber 41 by a transverse partition 42. The pulley halves 37 are spaced along and rigidly fastened to the input shaft 38 while the pulley halves 36 are slidable along a spline in the shaft 38. The several halves 36 are attached together by a series of rods 43 which pass through holes 44 in the rigidly mounted halves 37. The rods 43 after passing through a sealing ring 45 are secured in a nut 46 which is screwed onto the threaded hub 47 of a bevel gear 48. As in the previous example a gear train is provided for adjusting and maintaining the relative rotary positions of the shaft 38 and the threaded hub 47.

In this example a bevel gear 49 keyed to the shaft 38 meshes with bevel idler gears 50 journaled on studs 51 extending laterally from a sleeve 52 journaled on the shaft 38. The sleeve 52 has a worm wheel 53 keyed to its opposite end. The worm wheel 53 is adapted to be driven by a worm shaft which is rotated to change the pitch diameter of the pulleys. The bevel idlers 50 mesh with an inner row of teeth 54 of a bevel gear 55 which is journaled on the sleeve 52. The inner row of teeth 54 corresponds in number to the teeth of the bevel gear 49 while an outer row of teeth 56 of the bevel gear 55 meshing with and driving an idler 57 mounted on a stationary stud shaft 58 corresponds in number to the teeth of the gear 48. The idler 57 engages the bevel gear 48 whose threaded hub axially positions the nut 46 attached to the V-pulleys.

In this train of gears when the worm wheel 53 is held stationary and the input shaft 38 is rotated the first bevel gear 49 rotates with the shaft thereby driving the idlers 50. The idlers 50, whose axes are held stationary by the worm wheel 53, drives the bevel gear 55 in the opposite direction at the same speed as the input shaft 38. The outer row of teeth of the bevel gear 55, driving through the idler 57 whose axis is fixed, drives the bevel gear 48 in the opposite direction to the bevel gear 55 and consequently in the same direction as and at the same speed as the bevel gear 49 which is keyed to the shaft 38. If the input shaft 38 is held stationary and the worm wheel 53 is rotated, thereby rotating the axes of the idlers 50, the bevel gear 55 is turned in the same direction and twice as fast as the worm wheel. The rotation of the bevel gear 55 transmitted through the idler 57 rotates the bevel gear 48 in the opposite direction to and at the same speed as the bevel gear 55 thereby producing two revolutions of the bevel gear 48 with respect to the shaft 38 for each revolution of the worm wheel 53. The relative rotation between the threaded hub of the bevel gear 48 and the nut 46 which is held fixed by the rods 43 produces axial motion of the nut 46 and the movable halves 36 of the V-pulleys.

This pitch changing assembly is duplicated on the output shaft except that the left hand half of each pulley is fixed to the shaft and the right hand half is moved by its adjusting nut operating through connecting rods similar to the rods 43. By moving one half of each of the opposite co-operating pulleys equal amounts and in the same direction pitch changes of the pulleys are effected without disturbing the belt alignment because the belt in assuming its new position moves half as far as the pulley halves. This assembly has the same desirable characteristic in that no thrust produced by the wedging action of the V-belts is transmitted to the bearings journaling either the input or the output shaft. Furthermore, in this example the pulley halves are all keyed to the shaft so that there is no possibility of any of the transmitted power being transmitted through the gear train.

The gears in the gear train may be rearranged to provide a somewhat more compact structure as is shown in Figure V. In this example, illustrated with the same type of pulley holding elements as the first example, the gear train comprises a bevel gear 59 keyed to an input shaft 60. The bevel gear 59 meshes with bevel idler pinions 61 journaled on studs extending inwardly from arms 62 of a worm wheel 63 which is loosely journaled on the shaft 60. When the worm wheel 63 is held stationary and the input shaft 60 is faced bevel gear 64 which is also journaled on the shaft 60. The second face of the bevel gear 64 driving through an idler pinion 65 journaled on a stationary stud 66 rotates a bevel pinion 67 which is keyed to a pulley adjusting member 68. The pulley adjusting member 68 carries a series of rods 69 by which it may rotate the pulley halves forming the V-pulleys on threaded sleeves so as to change their axial spacing. In this example the bevel gears 59, 64 and 67 have each the same number of teeth and since there are two reversals of direction through the idler pinions 61 and 65 it is apparent that the bevel gear 67 and the adjusting member 68 rotate synchronously with the shaft 60 as long as the worm gear 63 is held stationary. Rotation of the worm wheel 63 by acting on the idler 61 rotates the two-faced bevel gear 64 in the same direction and twice as fast as the movement of the worm wheel 63. The rotation of the two-faced bevel gear 64 acting through the pinion 65 rotates the bevel gear 67 and the adjusting member 68 in the opposite direction to the rotation of the worm wheel 63 and twice as fast as the movement of the worm wheel 63. In this gear train as in the others the shaft 60 and the worm wheel 63 may be rotating simultaneously.

Another example of a gear train suitable for use with a variable speed transmission is illustrated in Figure VI. In this gear train a spur gear 70 keyed to a shaft 71 meshes with spur pinions 72 carried on studs 73 projected laterally from a worm wheel 74. The worm wheel 74 is journaled on the shaft 71 adjacent the spur gear 70. An internally toothed annulus 75 carried from a hub 76 journaled on the shaft 71 adjacent the spur gear 70 meshes with the idler pinions 72. The annulus 75 has beveled gear teeth 77 on one side which mesh with an idler pinion 78 journaled on a stationary axle 79. The idler pinion meshes with and drives a bevel gear 80 keyed to an adjusting member 81 in which a series of rods 82 are studded so that they may rotate halves 83 of V-pulleys on threaded sleeves 84 and thereby effect changes in pitch diameter. The numbers of teeth in the various gears of the train are selected so that a 1:1 velocity ratio is attained between the spur gear 70 and the adjusting member 81 with like rotational direction. This gear train operates in the same manner as those previously described and accomplishes the same results.

The torque exerted by the pulleys on either of the shafts produces friction between the pulleys and the threaded sleeves. The gears are required to overcome this friction during a change in speed and during continuous operation at a selected speed unless in some manner they are allowed to reverse slightly after an adjustment is complete. It is desirable to relieve these gears of the load when the transmission is operating at a constant speed. This may be done by mounting one of the gears in the gear train slightly eccentric with respect to its shaft. When this is done the velocity ratio through the gear train varies cyclically with the rotation of the eccentric number. This variation tends to cause the driven gear, which may be the gear connected to the adjusting member, to oscillate slightly with respect to the shaft on which it is journaled. If there is no backlash in the gear train the eccentricity of one gear would produce a positive oscillation of the adjusting gear on the shaft but when a small amount of backlash is allowed it provides a "lost motion" connection between the driving and driven gear such that force is applied through the gear train only at the ends of the cycle of oscillation. By making the backlash slightly greater than the oscillation produced by the eccentric gear the gear train tends to move the adjusting member only during the points of maximum amplitude of the superimposed oscillation and the gear train runs idle during the remainder—the greater portion—of the time. This method of gear unloading may be employed in any of the gear trains shown in the above examples. The amount of eccentricity required to accomplish this result is not great and may be accommodated by slightly increasing the center to center distances between the eccentrically mounted gear and those gears cooperating therewith.

In each of the above examples the axial movement of the pulley halves on one shaft is precisely equal and opposite to the axial motion of the pulley halves on the other shaft. If these pulleys have conical faces the change in pitch diameter is exactly proportional to the axial shift of the pulley halves. When the pulleys are mounted on fixed center to center distances and the change in pitch diameter is exactly proportional to the axial motion it is found that if the belt length is adjusted to give the proper tension when one pulley is adjusted to its maximum pitch diameter and the other to its minimum pitch diameter that the belt will be loose when the pulleys are adjusted to equal pitch diameters. The change in belt length required to maintain proper tension or its equivalent—the variation in pitch diameter required to maintain correct belt tension—may be easily computed. Using the notation as shown in Figure VII wherein $L$ represents the center to center distance of the pulleys, $2R$ represents the maximum effective pitch diameter of a pulley, $2r$ represents the minimum pitch diameter of a pulley, and $\theta$ is the angle between the belt line and the line connecting the centers of the pulleys. The belt length $BL$ is:

(1) $BL = R(\pi + 2\theta) + r(\pi - 2\theta) + 2\sqrt{L^2 - (R-r)^2}$ $= \pi(R+r) + 2\theta(R-r) + 2\sqrt{L^2 - (R-r)^2}$ In this equation $\theta$ is equal to $\arcsin \dfrac{R-r}{L}$ To apply this equation to the design of a suitable pulley face let $R_a$ represent the pitch radius when the pitch diameters of the two pulleys are equal, i. e., unity speed ratio. The slope of the pulley face must be selected to match the V-belt to be used. Let $\alpha$ represent the angle between a line tangent to the pulley face at $R_a$ and the axis of the pulley. Also let $m$ represent the axial shift of the point of contact of the pulley and belt as the pitch radius changes. An inspection of Equation 1 indicates that, when the changes in pitch radius are equal and opposite, the increase in belt length is generally proportional to the square of $(R-r)$. A parabola having its axis of symmetry perpendicular to the pulley axis satisfies this condition.

The general equation of a family of parabolas on this axis is:

(2) $x^2 = 4a(K-y)$

The tangent to those parabolas passing through $R_a$ at the radius $R_a$ is:

$\tan \alpha = \dfrac{dy}{dx} = -\dfrac{x}{2a} = -\dfrac{\sqrt{4a(K-R_a)}}{2a}$

From this the equations representing the values of $R$ and $r$ may be derived in terms of the parabolas and $m$, the axial shift in the $x$ direction. Thus substituting in Equation 2:

(3) $(\sqrt{4a(K-R_a)} - m)^2 = 4a(K-R)$ (4) $(\sqrt{4a(K-R_a)} + m)^2 = 4a(K-r)$ Solving for $R$ and $r$ gives:

(5) $R = R_a + \dfrac{2m}{4a}\sqrt{4a(K-R_a)} - \dfrac{m^2}{4a}$ (6) $r = R_a - \dfrac{2m}{4a}\sqrt{4a(K-R_a)} - \dfrac{m^2}{4a}$ From these equations:

$(R+r) = 2R_a - \dfrac{m^2}{2a}$ $(R-r) = \dfrac{m}{a}\sqrt{4a(K-R_a)} = -2m \tan \alpha$ For convenience write $-2m \tan \alpha = pL$ Then $R - r = pL$ and $\arcsin \dfrac{R-r}{L} = \arcsin p$ Substituting these values in Equation 1 gives:

$BL = 2\pi R_a + 2L = 2\pi R_a - \dfrac{\pi m^2}{2a} +$ $2pL \arcsin p + 2\sqrt{L^2 - p^2 L^2}$ Solving for $\dfrac{m^2}{4a}$:

$-\dfrac{m^2}{4a} = +\dfrac{L - pL \arcsin p - L\sqrt{1-p^2}}{\pi}$ $-\dfrac{m^2}{4a} = +\dfrac{L}{\pi}(1 - p \arcsin p - \sqrt{1-p^2})$ Substituting in Equations 5 and 6:

(7) $R = R_a - m \tan \alpha + \dfrac{L}{\pi}(1 - p \arcsin p - \sqrt{1-p^2})$ (8) $r = R_a + m \tan \alpha + \dfrac{L}{\pi}(1 - p \arcsin p - \sqrt{1-p^2})$ $R$ is larger than $r$ because the tangent of $\alpha$, the slope of the tangent line, is negative. Since $p$ is equal to $-\dfrac{2m \tan \alpha}{L}$ these equations represent the exact values for the radii of the pulleys for various values of $m$.

To determine the constants of the parabola, in which the unknown terms are $a$ and $K$, first solve the expression for $-\dfrac{m^2}{4a}$ (9) $a = -\dfrac{\pi m^2}{4L(1 - p \arcsin p - \sqrt{1-p^2})}$ Since the term in parentheses cannot be expressed as an exact function it is impossible to write the equation of one parabola which will fit the theoretical curve along its full length. However a parabola can be drawn through any three points of the theoretical curve. The coefficients to give this parabola may be found by substituting the selected value of $m$ in Equation 9, remembering that $p$ is a direct function of $m$. Having found $a$ and having previously selected $\alpha$ and $R_a$, $K$ may easily be found by substituting into the equation of the slope of the tangent line and solving for K. Thus:

(10)  $K = R_a + a \tan^2 \alpha$

Having found the equations representing R and r, the ratio between maximum and minimum speeds may be easily derived. The maximum output speed is R/r times the input speed, while the minimum output speed is r/R times the input speed. The ratio of these speeds is R/r divided by r/R, i. e., $(R/r)^2$.

In this derivation it was assumed that the radial deviations from the line tangent to the pulley face were the same for an increasing radius as for a decreasing radius. This is an arbitrary condition because the deviations from a true cone required to maintain correct belt tension may all be applied to that limb of the curve defining R, leaving r defined by the tangent line through $R_a$. This can be done by multiplying the last term of Equation 5 by 2, and dropping the last term of Equation 6. This is only one of many possible variations because only the average value of the radii is fixed.

Using a parabola to define the pulley face affords another advantage in that the slope of the face decreases for larger radii and increases for smaller radii. This corresponds generally to the change in cross sectional outline of a V-belt as it passes around a pulley. Rubber, a common material for the body of a belt, is nearly incompressible. When it is used to absorb shock it is allowed freedom to expand at right angles to the line of action of the force through it. Without this freedom it is very stiff and unyielding. As a V-belt has a cord or wire center to prevent stretching, its inner face must expand sideways when it is wrapped around a pulley thereby decreasing the angle between its sides. The amount of this change is generally proportional to the radius of the pulley and is matched by the change in slope of the belt contacting part of the improved pulley shape. Therefore, with the improved pulleys, the belt runs in full contact with the V-pulley regardless of pitch radius.

Having described the invention, I claim:

1. In a device of the class described, in combination, a case, a partition dividing the case into compartments, a pair of shafts extending through the case and partition in parallel alignment, a plurality of threaded members keyed to the portions of the shafts enclosed in one of the compartments, generally cone faced disks having threaded hubs supported on the threaded members and cooperating to form pulleys, a ring surrounding each shaft and lying in the plane of the partition, a plurality of rods extending from the ring and engaging the disks to maintain them in rotative alignment, and differential gear trains enclosed in the other of the compartments, the differential gear trains serving to drivingly connect each ring to its shaft to permit rotative adjustment of the ring with respect to the shaft for adjusting the pitch radii of the pulleys.

2. In a device of the class described, in combination, a pair of parallelly disposed shafts, a plurality of generally cone faced disks mounted on the shafts and cooperating to form pulleys, threaded members for holding the disks in spaced relation and for varying the spacing to vary the pitch radii of the pulleys, a planetary gear system journaled on each shaft intermediate its ends, each planetary gear system comprising a first portion keyed to the supporting shaft, a second portion that engages an adjusting member and is rotatable independently of the rotation of the shaft, and a third portion that is operatively connected to said threaded members through a gear train including a member journaled on a fixed axis, said planetary gear system being proportioned so that the threaded members are held stationary with respect to the disks when the adjusting member is stationary and are rotated relative to the disks according to rotation of the adjusting member.

3. In a device of the class described, in combination, a pair of parallelly disposed shafts, right and left hand threaded members keyed to the shafts, a plurality of generally cone faced disks threadedly mounted on said members, a ring mounted on each shaft, a plurality of rods extending from the rings and engaging the disk, a planetary gear system journaled on each of said shafts, each gear system comprising one portion that is keyed to the supporting shaft, another portion that engages an adjustable element, and another portion that engages a geared member journaled on a fixed support and meshing with a gear attached to said ring, the portions of the planetary gear systems being proportioned to drive the rings in synchronism with the shafts when the adjustable element is stationary and rotates the rings relative to the shafts when the adjustable element is operated.

4. In a device of the class described in which the pitch radius of a V-belt pulley is varied by axial adjustment of cooperating cone faced disks forming the pulley, in combination, a shaft on which the pulleys are mounted, threaded means for holding the disks in axial spaced relation, a planetary gear train having a sun gear keyed to the shaft, a planet carrier that is journaled on the shaft and that has planet pinions meshing with the sun gear, adjusting means for rotating the planet carrier independently of rotation of the shaft, an annular gear rotatively journaled on the shaft and meshing with the planet pinions, and gearing that includes a gear journaled on a fixed axis for operatively connecting the annular gear to the threaded means, said planetary gear train causing the threaded means to change the pitch radius of the pulleys only when said planet carrier is rotated.

ROBERT D. MORSE.

REFERENCES CITED

The following references are of record in the file of this patent:

UNITED STATES PATENTS

| Number | Name | Date |
| --- | --- | --- |
| 516,197 | Given et al. | Mar. 13, 1894 |
| 583,402 | Reeves | May 25, 1897 |
| 1,913,226 | Adams | June 6, 1933 |
| 1,993,547 | Heyer | Mar. 5, 1935 |
| 2,101,845 | Fraser | Dec. 14, 1937 |
| 2,158,047 | Weston | May 9, 1939 |
| 2,348,994 | Otto | May 16, 1944 |

FOREIGN PATENTS

| Number | Country | Date |
| --- | --- | --- |
| 154,844 | Great Britain | Dec. 9, 1920 |